Oct. 15, 1963

C. V. STANLEY ETAL 3,107,300

INFRARED ENERGY TRACKING SYSTEM COMPRISING OSCILLATORY SCANNER

Filed Oct. 21, 1960

INVENTORS,
CHARLES V. STANLEY
RICHARD K. ORTHUBER
BY
*Isadore Togut*
ATTORNEY

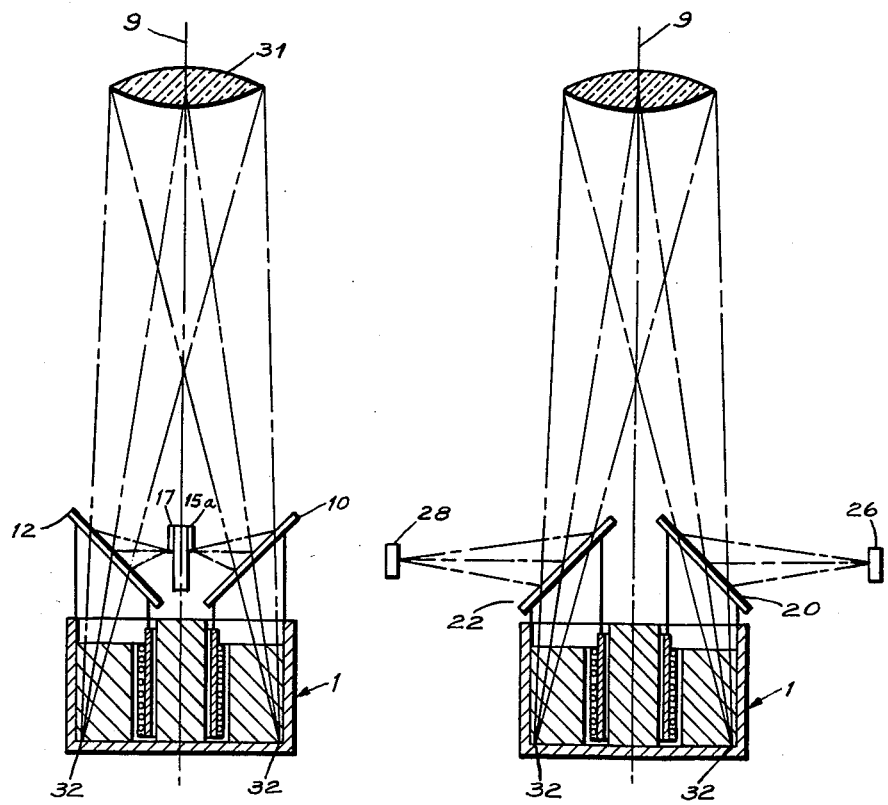

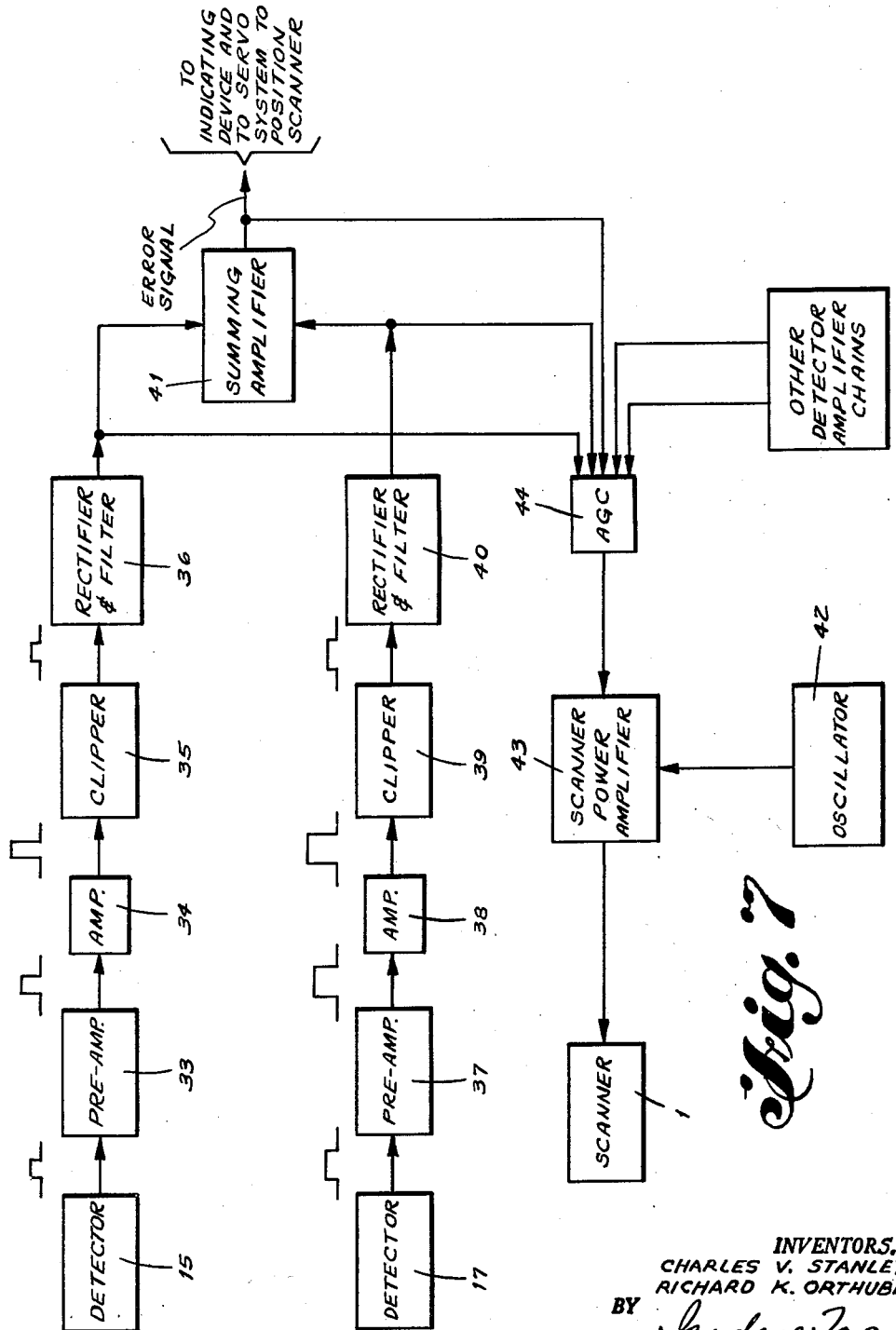

Oct. 15, 1963   C. V. STANLEY ETAL   3,107,300
INFRARED ENERGY TRACKING SYSTEM COMPRISING OSCILLATORY SCANNER
Filed Oct. 21, 1960   4 Sheets-Sheet 4

INVENTORS.
CHARLES V. STANLEY
RICHARD K. ORTHUBER
BY
ATTORNEY

3,107,300
INFRARED ENERGY TRACKING SYSTEM COMPRISING OSCILLATORY SCANNER

Charles V. Stanley, Granada Hills, and Richard K. Orthuber, Sepulveda, Calif., assignors to International Telephone and Telegraph Corporation, Nutley, N.J., a corporation of Maryland
Filed Oct. 21, 1960, Ser. No. 64,018
13 Claims. (Cl. 250—83.3)

This invention relates to a radiant energy tracking system and more particularly to optical scanning devices.

It is an object of this invention to provide an improved radiant energy tracking apparatus.

It is a further object to provide an improved attitude sensor or horizon scanner which has no rotating parts, substantially long potential life and is inexpensive to operate and maintain.

A feature of this invention is the provision of a system for determining the direction of arrival of radiant energy from a distant source, such as a planet or a star, which includes a transducer and a plurality of reflecting members supported by the transducer and disposed about the axis thereof. Means are coupled to the transducer to provide a reciprocal motion thereto which, in turn, imparts an oscillatory motion to the reflecting members. Detection means, such as infrared detectors, responsive to the radiant energy of the source reflected by the reflecting members are disposed in the appropriate position adjacent the reflecting members. Means responsive to the output of the detection means detect any divergence between the direction of the source and the axis.

The above-mentioned and other features and objects of this invention and the manner of attaining them will become more apparent and the invention itself will be best understood by reference to the following description of the invention taken in conjunction with the accompanying drawings, wherein—

FIG. 5 is a diagram illustrating the optical organization of the tracking system using the scanner of FIG. 1;

FIG. 6 is a diagram illustrating the optical organization of the tracking system using the scanner of FIG. 3;

FIG. 7 is a block diagram of the electronic system to be used with the scanner of FIG. 1 or FIG. 3;

This invention is useful in determining the attitude of an orbiting vehicle with reference to a planet, such as the earth, using passive electromagnetic radiation from the planet as a reference signal source. Radiation from the source is focused in a plane beyond detectors responsive to the radiation except at those small areas along the edge of the image where small mirrors deflect the image edge inward to the plane of the detectors. These mirrors are mounted on flat springs which are attached to the frame of a transducer, such as a speaker-driver assembly, at their outer edge and to the voice coil thereof at the center. Movement of the voice coil causes the mirrors to oscillate, sweeping the edge of the image alternately on and off the detectors. As all mirrors move in phase, the signal output from the detectors will be coincident in time only when the object or the planet, in this case, is centered on the optical axis of the system, and any time delay in one signal with respect to another is a measure of the angular misalignment of the optical axis from the center of the planet or the source of radiation.

Figure 1:
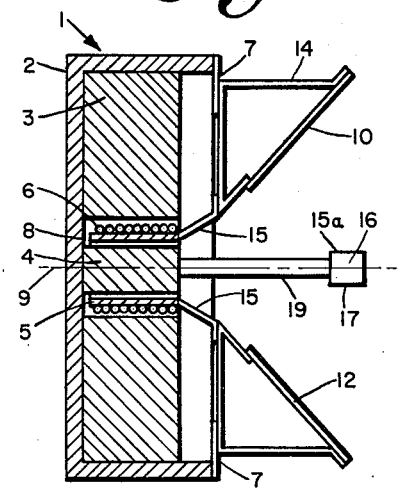
FIG. 1 is a cross section view of one embodiment of the scanner of this invention.
Figure 2:
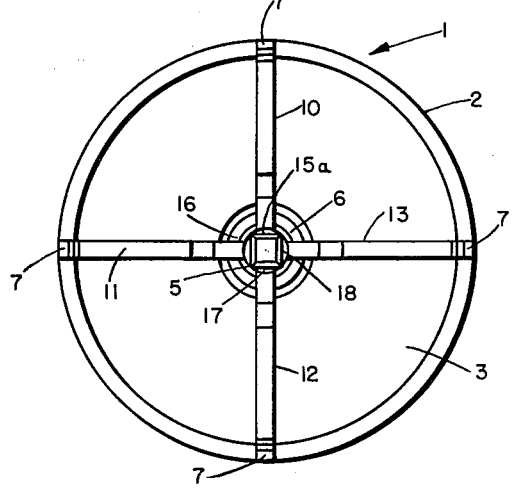
FIG. 2 is a plan view of the scanner of FIG. 1.

Referring now to FIGS. 1 and 2, there is shown one embodiment of the scanner of the invention and comprises a transducer 1 which is similar to a speaker-driver assembly. The transducer comprises an outer frame or housing 2 inside of which is supported a magnet structure of the permanent magnet type 3 and a central core 4. A voice coil assembly 5 is centered about the core 4 between the respective poles of the magnet structure 3. A source of energy, not shown, is coupled to the coil 6 of the voice coil assembly 5 to drive the voice coil assembly in the usual reciprocating motion. The leaf springs 7 are fastened at the outer edge to the frame 2. Disposed about the central axis 9 of the transducer 1 and as shown more clearly in FIG. 2 are four reflecting members or mirrors 10, 11, 12 and 13, equally spaced about the center of the transducer 1 and angularly disposed to the central axis thereof. Each of the mirrors is supported at one end by a leaf spring 7 through the mirror mount 14, and supported at the other end by another leaf spring 15 which is fastened to the driving member or cylindrical member 8 of the voice coil 5 of the transducer 1. Since only small deflections are required, the use of a material in the leaf spring, such as quartz, would provide almost infinite life for the spring. Each of the reflecting members or mirrors is formed of a substantially rectangular piece of reflecting material with the long axis disposed normal to the axis 9 of the transducer 1.

As shown more clearly in FIG. 2, each of the reflecting members is disposed 90 degrees apart from the other. While four reflecting members are shown here, it is understood that more or less may be used as required. Disposed adjacent to each reflecting member or mirror and adapted to receive radiation therefrom are four detectors for infrared radiation 15a, 16, 17 and 18. These detectors are supported on a member 19 which is fastened to the central core 4 of the transducer 1 so that these detectors are in a fixed position relative to the mirrors. It is understood, of course, that the reflecting surfaces of each of the mirrors 10 to 13, inclusive, are inward of the axis 9 to reflect any incoming radiation to the detectors 15 to 18, inclusive.

Figure 3:
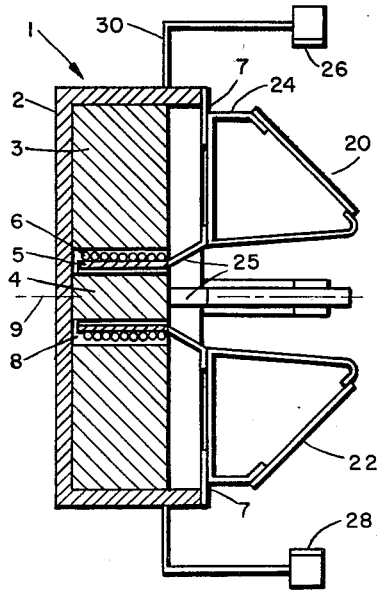
FIG. 3 is another embodiment of the scanner.
Figure 4:
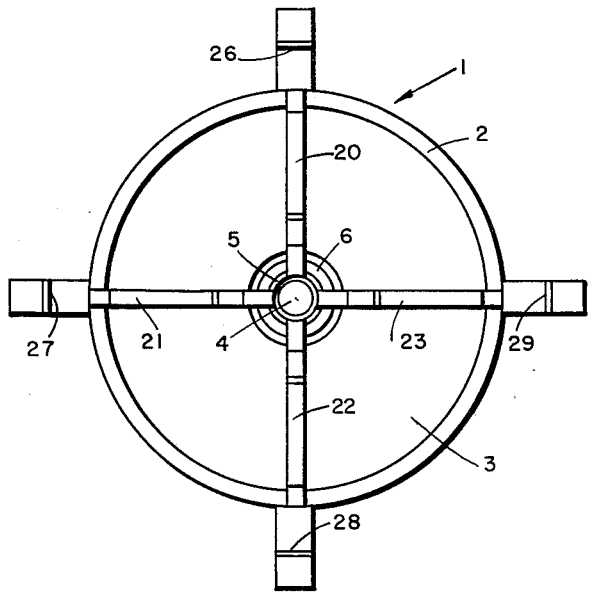
FIG. 4 is a plan view of the scanner of FIG. 3.

In FIGS. 3 and 4 is shown an alternative embodiment of the scanner wherein the mirrors are rotated 180 degrees and the reflecting surfaces thereof are positioned away from the axis 9 of the transducer 1. Mirrors 20, 21, 22 and 23 are disposed in an angular manner to the axis 9 with the reflecting surfaces outward with reference to the axis 9. Each of the mirrors 20 to 23, inclusive, are supported at one end through the mirror mounts 24 by a leaf spring 7 which is attached to the transducer housing 2 and the other end of each of these mirrors is supported by a leaf spring 25 which is fastened to the voice coil 5 at the center of the transducer 1. In this case, the detectors are disposed outside of the transducer 1 to receive the radiation reflected outwardly by each of the mirrors 20 to 23. Each of the detectors 26 to 29, inclusive, are supported by a member 30 which, in turn, is supported in a fixed position by the housing 2 of the transducer 1.

With reference to FIG. 5, the optical arrangement of the tracking system using the scanner of FIG. 1 is shown. The planet or source of radiation is imaged by a lens 31 onto a focal plane 32 except for four small equally spaced segments of the edge of the source which are folded by the mirrors 10 to 13, inclusive, of which in this figure only 10 and 12, so that they are imaged in the plane of the detector associated with the particular mirror. In this case detector 15a associated with mirror 10 and detector 17 associated with mirror 12 are shown. It is these four segments which are used in determining the deviation of the optical axis 9 of this system from the geometric center of the source of radiation.

FIG. 6 shows the optical organization of the tracker using the scanner of FIG. 3 where the mirrors are reversed 180 degrees to reflect the radiation away from the optical axis 9 of the system and toward the detectors 26 to 29, inclusive, disposed outside in the appropriate position relative the respective reflecting mirror. The advantage of the embodiment of FIG. 1 is that detectors requiring cooling can be kept close together and one cooling system would suffice for all four. In the embodiment of FIG. 3, with detectors requiring cooling, it is obvious that a separate cooling device would be required for each of the particular detectors.

When a signal is applied to the voice coil 5, it produces a reciprocating or to-and-fro movement of the voice coil 5 which, in turn, causes the mirrors to oscillate or move in a backward and forward nodding motion, thus sweeping the edge of the image of the source alternatively on and off the detectors. Since all the mirrors move in phase, the signal output from the detectors will be coincident in time only when the object or source is centered on the optical axis 9 of the system and any time delay in one signal with respect to another is a measure of the angular misalignment of the optical axis from the center of the object. Three or four detectors may be used for a circular object.

Referring now to FIG. 7 which is the block diagram of an electronic system to be used with the scanners of FIG. 1 or FIG. 3, there is shown a system for only two detector chains or utilizing the output of opposite pairs of detectors. That is, in using FIG. 1 as an example, the output of detector 15 is compared with the output of detector 17 to determine the misalignment with respect to the vertical axis and the output of detector 16 is compared with the output of the detector 18 to determine any misalignment with respect to the horizontal axis. Therefore, in a discussion of the electronic system of FIG. 7, it is to be understood that only the outputs of opposite pairs are to be compared in the system to determine any error signal and for one complete scanner, it would be necessary to use four channels instead of the two shown. The output of detector 15 is coupled to the preamplifier 33. The output from the detector 15 as well as from the other detectors is in the form of a rectangular wave having a repetition frequency equal to the scanning frequency, that is, to the frequency of the oscillatory motion of the speaker diaphragm 7, and has a duty cycle that varies with the deviation from the optical axis 9 of the source of radiation that is being scanned. The output of preamplifier 33 is coupled to an amplifier 34 and the output of amplifier 34 is coupled to a clipper 35. The signal clipper is used to maintain a constant signal output regardless of variations in the source brightness, the cell sensitivity of the detector, differences in optical transmission and any differences in the preamplifier and amplifier gain. The clipped waveform output of clipper 35 is rectified and filtered in the rectifier and filter 36 to produce D.C. voltages that are directly proportional to the duty cycle of the rectangular wave output of the detector 15. The filter time constant is selected to be compatible with a requirement of the individual control system and in general the time constant should be very long with respect to the scanning frequency and very short compared to the period of oscillation of the vehicle which carries this tracking system. The longer the time constant chosen, the greater will be the signal-to-noise ratio. The output of detector 17 is coupled to a preamplifier 37 whose output is amplified in the amplifier 38 and the output of amplifier 38 is clipped in the clipper 39. The output of clipper 39 is coupled to the rectifier filter 40 where a D.C. voltage is secured. The outputs of rectifier filters 36 and 40 are fed into a summing amplifier 41. The rectifiers for opposing pairs of detectors will be reversed to produce opposite polarity voltages for summing, and so that when the duty cycle is increasing in one path it will be decreasing in the opposite path. The D.C. voltages from rectifier filters 36 and 40 are added in the summing amplifier 41, which will produce an error signal when the object is off the optical axis 9. The output from this amplifier will be zero when the radiation source is on the axis. For an off axis condition, the polarity of the output will indicate the direction of the deviation, and the amplitude will indicate its magnitude. The output of the summing amplifier or the error signal is coupled to the appropriate indicating device (not shown) and to a servo system (also not shown) to position the scanner to achieve the null signal. The scanner is driven by a voltage derived from a fixed frequency oscillator 42 which is amplified in a power amplifier 43, the output of which is coupled to the voice coil 5 of the transducer 1. The frequency of the oscillator 42 must be compatible with the chopping frequency requirements of the infrared or other type of radiation detectors and for maximum energy conversion efficiency will be centered at the resonant frequency of the scanner. The amplitude of the scanner voltage or the output of the power amplifier 43 is determined by the automatic gain control 44. The error signal of 41 together with the D.C. signal output of rectifiers 36 and 40 and all the other D.C. signal and error signal output of the other detector channels are connected to the AGC control 44. In the event that there is a large error signal of either polarity from any or all the channels or there is a zero error signal from any summing amplifier and a zero signal from one or both of the channels driving it, the AGC voltage will cause a large scanning voltage to be produced from the scanner power amplifier 43. In the event that a small or zero error signal emanates from all the summing amplifiers and large signals from all the channels driving them, then a small scanning voltage will be called for by the AGC from the scanner power amplifier. In the first condition cited, it is obvious that the orientation or the aiming of the scanner 1 is so far off that no signal is being produced from any of the detectors because no radiation is being received by the mirror associated with the particular detector and to reflect onto that detector. In the second case, it is evident that the aiming of the scanner is substantially correct or substantially on target because large signals are being produced from the detectors and therefore smaller excursions of the voice coil are required.

At the 22,300 mile orbital height for which it is proposed to orbit a satellite, the earth subtends an angle of 17.2 degrees which can be covered by a relatively simple lens system. With the folding mirrors located 2.5 cm. from the image plane 32, a 5 mm. lever arm to the mirror will give coverage of ±2 degrees for acquisition from a .87 mm. movement of the voice coil 5.

The automatic gain control for the speaker-driver amplifier 43 can be used to reduce this amplitude, and thus the power input, after acquisition of the target, should this be desirable from the standpoint of power conservation or for increased accuracy.

Figure 8:
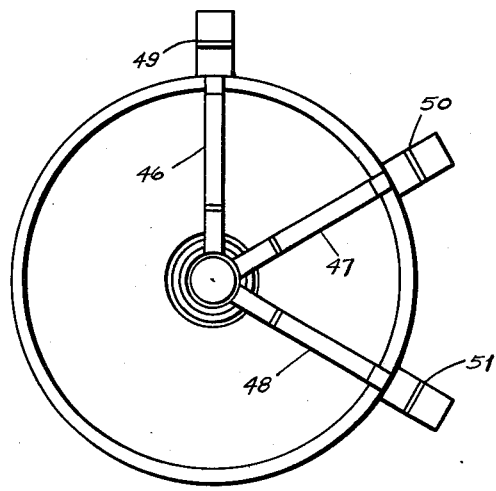
FIG. 8 is an elevation view of a third embodiment of the scanner of this invention.
Figure 9:
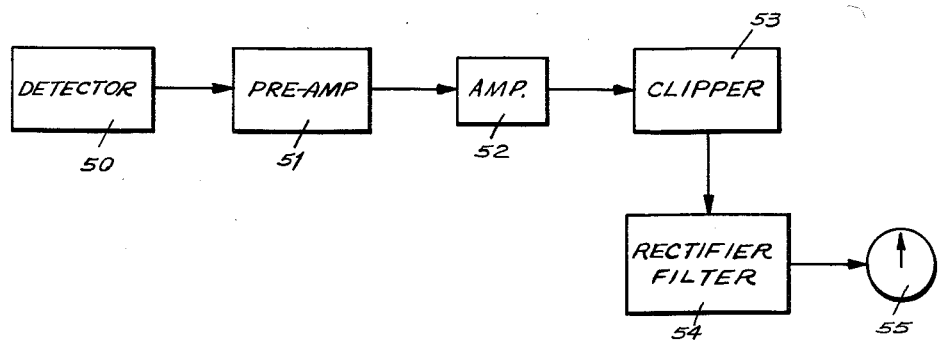
FIG. 9 is a block diagram of the electronics associated with the scanner of FIG. 8.

FIG. 8 indicates the positioning of three mirrors 46, 47 and 48 and three coacting detectors 49, 50 and 51 when the scanner is to be used with three point objects, such as stars, for navigation purposes. In this case, the mirrors and detectors are positioned according to the known orientation of the stars in such a manner as to give signals of equal duration from each of the three detectors 49, 50 and 51 when the axis of the system is in a fixed relationship to the three stars. Any change in relationships between the axis of the system and the preset relationship will cause a variation in the duration of the signals from the detectors which can be used to determine the displacement from the axis of the system. The disposition and mounting of the mirrors and the detectors in FIG. 8 is similar to the structure of FIG. 3 except that the angular spacing of FIG. 8 is not necessarily equal but is variable and determined by the orientation of the stars which are to be scanned. The electronic system associated with the scanning arrangement of FIG. 8 is shown in FIG. 9. Only one channel is shown though it is to be understood that three channels are required, one for each of the detectors 49, 50 and 51. As explained above, the output of each of the detectors is in the form of a rectangular waveform that is amplified in the preamplifier 51 and amplifier 52, clipped in the clipper 53 and rectified in the rectifier and filter 54 to produce a D.C. voltage the variation of which is directly proportional to the displacement of the axis of the system from the predetermined orientation of the stars. The D.C. voltage output of the rectifier and filter 54 is coupled to an indicating device 55, such as a meter for visual display. The mirrors and detectors are positioned for the known orientation of the stars so that the outputs of the indicating devices or meters for all the detectors 49, 50 and 51 are equal. If any deviation of the scanning system axis from the predetermined orientation occurs, the meter indications will show unequal outputs and correction measures can then be taken to correct the course of the vehicle carrying the scanner in the correct direction and orientation.

While we have described above the principles of our invention in connection with specific apparatus, it is to be clearly understood that this description is made only by way of example and not as a limitation to the scope of our invention as set forth in the objects thereof and in the accompanying claims.

We claim:

1. A system for determining the direction of arrival of radiant energy from a distant source comprising a transducer having a magnetic structure, a plurality of reflecting members supported by said transducer and disposed about the axis of said transducer, means coupled to said transducer to impart relative motion to said reflecting members in the direction of said transducer axis, detection means responsive to the radiant energy of said source reflected by said reflecting members and means responsive to the output of said detection means to detect divergence between the direction of said source and said axis.

2. A system for determining the direction of arrival of radiant energy according to claim 1 wherein said relative motion imparted to said reflecting members is an oscillatory motion.

3. A system for determining the direction of arrival of radiant energy according to claim 2 wherein said transducer comprises a magnetic structure, a coil disposed within the magnetic field of said magnetic structure and adapted to receive a signal from a source of energy, and means coupling said reflecting members to said coil whereby when said coil is energized by said signal said reflecting members will oscillate in unison with the movement of said coil within the magnetic field.

4. A system for determining the direction of arrival of radiant energy according to claim 3 wherein said transducer includes a housing and further includes first resilient means coupling one end of each said reflecting members to said housing, second resilient means coupling the other end of each said reflecting members to said coil, said first and second resilient means disposing said reflecting members in angular relation to the axis of said transducer and equally spaced about said axis.

5. A system according to claim 4 further including a plurality of infrared detectors, means supporting said detectors about said axis, each said detector being disposed in coacting relationship to a corresponding one of said reflecting members whereby any radiation received from said source will be reflected by said reflecting member onto a corresponding detector, means to amplify the output of each said detector, means to rectify said output, first comparison means, means coupling the rectified outputs of a first opposing pair of said detectors to said first comparison means to derive an error signal output therefrom when the outputs of each of said pair of detectors are unequal thus indicating the deviation of the axis of said transducer from the direction of said source in a first plane, second comparison means, means coupling the rectified outputs of a second opposing pair of said detectors to said second comparison means to derive an error signal output therefrom when the outputs of each of said second pair of detectors are unequal thus indicating the deviation of the axis of said transducer from the direction of said source in a second plane orthogonal to said first plane.

6. A system for determining the direction of arrival of radiant energy from a distant source comprising means creating an image of said source at a reference plane, a transducers having a magnetic structure, means supported by said transducer about the axis of said transducer dividing said image into a plurality of portions, means coupled to said transducer to impart oscillatory motion to said dividing means in the direction of said transducer axis, detection means responsive to the radiation from said source transmitted by said dividing means and means responsive to the output of said detection means to determine the direction and extent of displacement of said axis from the direction of said source.

7. A tracking system for determining the attitude of a vehicle with respect to a remote source of radiation comprising scanning means carried by said vehicle and responsive to radiation from said source, said scanning means comprising means creating an image of said radiation source at a reference plane, a transducer having a magnetic structure, a plurality of reflecting members supported by said transducer and disposed about the axis thereof, means coupled to said transducer to impart oscillatory motion to said reflecting members in the direction of said transducer axis, detection means responsive to the radiation from said source reflected by said reflecting members, and means responsive to the output of said detection means to determine the attitude of said vehicle with reference to said source of radiation.

8. An optical scanning system, comprising means creating an image of a remote energy source at a reference plane, a coil disposed within the magnetic field of said magnetic structure and adapted to receive a signal from a source of energy, a housing containing said magnetic structure and said coil, a plurality of reflecting members responsive to said image, resilient means coupling said reflecting members to said coil, said resilient means disposing each said reflecting member in angular relation to the axis of said magnetic structure and equally spaced about said axis, a plurality of infrared detectors, means supporting said infrared detectors about said axis, each said detector being in coacting relation to a corresponding one of said reflecting members, whereby any radiation received by each said reflecting member from said energy source will be reflected by said reflecting member on to the surface of the coacting disposed detector, and when said coil is energized by said signal and moves in a reciprocating motion along said axis, said reflecting members will move in an oscillatory motion in unison with the movement of said coil.

9. An optical scanning system, comprising means creating an image of a remote energy source at a reference plane, a magnetic structure, a coil disposed within the magnetic field of said magnetic structure and adapted to receive a signal from a source of energy, a housing containing said magnetic structure and said coil, a plurality of reflecting members responsive to said image, first resilient means coupling one end of each said reflecting members to said housing, second resilient means coupling the other end of each said reflecting members to said coil, said first and second resilient means disposing each said reflecting member in angular relation to the axis of said magnetic structure and equally spaced about said axis, a plurality of infrared detectors, means supporting said infrared detectors about said axis, each said detector being in coacting relation to a corresponding one of said reflecting members, whereby any radiation received by each said reflecting member from said energy source will be reflected by said reflecting member on to the surface of the coacting detector, and when said coil is energized by said signal and moves in a reciprocating motion along said axis, said reflecting members will move in an oscillatory motion in unison with the movement of said coil.

10. An optical scanning device comprising a magnetic structure, a coil disposed within the magnetic field of said magnetic structure and adapted to receive a signal from a source of energy, a housing containing said magnetic structure and said coil, a plurality of reflecting members, first resilient means coupling one end of each said reflecting members to said housing, second resilient means coupling the other end of each said reflecting members to said coil, said first and second resilient means disposing each said reflecting member in angular relation to the axis of said magnetic structure and equally spaced about said axis with the reflecting surfaces of said reflecting members directed towards said axis, a plurality of infrared detectors, means supporting said infrared detectors about said axis, each said detector being in opposed and coacting relation to a corresponding one of said reflecting members, whereby any radiation received by each said reflecting member from a source of radiation will be reflected by said reflecting member on to the surface of the coacting detector, and when said coil is energized by said signal and moves in a reciprocating motion along said axis, said reflecting members will move in an oscillatory motion in unison with the movement of said coil.

11. An optical scanning device comprising a magnetic structure, a coil disposed within the magnetic field of said magnetic structure and adapted to receive a signal from a source of energy, a housing containing said magnetic structure and said coil, a plurality of reflecting members, first resilient means coupling one end of each said reflecting members to said housing, second resilient means coupling the other end of each said reflecting members to said coil, said first and second resilient means disposing each said reflecting member in angular relation to the axis of said magnetic structure and equally spaced about said axis with the reflecting surfaces of said reflecting members directed away from said axis, a plurality of infrared detectors, means supporting said infrared detectors about said axis, each said detector being in opposed and coacting relation to a corresponding one of said reflecting members, whereby any radiation received by each said reflecting member from a source of radiation will be reflected by said reflecting member on to the surface of the coacting detector, and when said coil is energized by said signal and moves in a reciprocating motion along said axis, said reflecting members will move in an oscillatory motion in unison with the movement of said coil.

12. A tracking system for determining the attitude of a vehicle with respect to a plurality of remote sources of radiation comprising scanning means carried by said vehicle and responsive to radiation from said sources, said scanning means comprising a transducer having a magnetic structure, a plurality of reflecting members supported by said transducer and disposed about the axis thereof, each of said reflecting members being responsive to radiation from one of said sources, means coupled to said transducer to impart oscillatory motion to said reflecting members in the direction of said transducer axis, detection means responsive to radiation from each said source disposed in coacting relationship with each said reflecting member, and means responsive to the output of each said detection means to determine the attitude of said vehicle with reference to said source of radiation.

13. A tracking system according to claim 11 wherein said reflecting members and coacting detection means are disposed to provide equal outputs from each said detection means when the axis of said scanning means is oriented in a predetermined direction with reference to said sources of radiation.

References Cited in the file of this patent
UNITED STATES PATENTS 2,897,369    Ketchledge _____ July 28, 1959

OTHER REFERENCES

McCartney, E.G. (1958), "A Horizon Seeker for Atmospheric Re-entry," Advances in Astronautical Sciences, vol. 4, Plenum Press, N.Y., 1959, pp. 86–97.